(12) United States Patent
Struck (10) Patent No.: US 12,515,928 B2
(45) Date of Patent: Jan. 6, 2026

(54) LIFTING GEAR (71) Applicant: COLUMBUS MCKINNON INDUSTRIAL PRODUCTS GMBH, Wuppertal (DE)

(72) Inventor: Detlef Struck, Wuppertal (DE)

(73) Assignee: COLUMBUS MCKINNON INDUSTRIAL PRODUCTS GMBH, Wuppertal (DE)

( * ) Notice: Subject to any disclaimer, the term of this patent is extended or adjusted under 35 U.S.C. 154(b) by 229 days.

(21) Appl. No.: 18/273,140

(22) PCT Filed: Nov. 29, 2021

(86) PCT No.: PCT/DE2021/100947
§ 371 (c)(1),
(2) Date: Jul. 19, 2023

(87) PCT Pub. No.: WO2022/156839
PCT Pub. Date: Jul. 28, 2022

(65) Prior Publication Data
US 2024/0101400 A1    Mar. 28, 2024

(30) Foreign Application Priority Data
Jan. 19, 2021   (DE) ..................... 10 2021 101 058.6

(51) Int. Cl.
*B66D 3/20* (2006.01)
*B66D 3/16* (2006.01)
*B66D 5/14* (2006.01)

(52) U.S. Cl.
CPC ................ *B66D 3/20* (2013.01); *B66D 3/16* (2013.01); *B66D 5/14* (2013.01)

(58) Field of Classification Search
CPC ........ B66D 5/14; B66D 3/12–16; B66D 3/18; B66D 3/20; B66D 5/12; B66D 5/20
See application file for complete search history.

(56) References Cited

U.S. PATENT DOCUMENTS

| 3,090,601 A | 5/1963 | Robins et al. |
| 4,502,667 A | 3/1985 | Nakamura |

(Continued)

FOREIGN PATENT DOCUMENTS

| CN | 200981801 Y | 11/2007 |
| CN | 201619981 U | 11/2010 |

(Continued)

OTHER PUBLICATIONS

Office Action for VN application No. 1-2023-05114, mailed Mar. 21, 2025; 3pp.

(Continued)

*Primary Examiner* — Anna M Momper
*Assistant Examiner* — Nathaniel L Adams
(74) *Attorney, Agent, or Firm* — HAUPTMAN HAM, LLP (57) ABSTRACT

A lifting gear has a load chain sprocket and a drive shaft. The drive shaft drives the load chain sprocket. The lifting gear has a motor having a motor shaft. The motor shaft and the drive shaft are coupled by a brake clutch system. The brake clutch system includes a clutch part and a brake hub on a brake thread of the drive shaft. The clutch part has dogs and the brake hub has pegs. A vane disk is between the clutch part and the brake hub. The vane disk has vane bodies on a coupling portion of the drive shaft. A pressure plate is positioned in a rotationally fixed manner on the drive shaft. Two friction disks are between the brake hub and the pressure plate, and a brake disk is between the two friction disks, and the brake disk is mounted in a rotationally fixed manner.

14 Claims, 9 Drawing Sheets

(56) References Cited

U.S. PATENT DOCUMENTS

| | | | | |
|---|---|---|---|---|
| 4,512,555 | A | * | 4/1985 | Nakamura ............... B66D 3/14 254/350 |
| 4,690,379 | A | * | 9/1987 | Nakamura ............... B66D 3/18 192/223.4 |
| 5,482,255 | A | | 1/1996 | Daschel et al. |
| 5,575,457 | A | * | 11/1996 | Inoue ....................... B66D 3/14 254/352 |
| 6,059,267 | A | * | 5/2000 | Nishimura ............... B66D 3/14 254/352 |
| 7,222,700 | B2 | * | 5/2007 | Elliott ..................... F16D 67/00 188/30 |
| 10,351,397 | B2 | | 7/2019 | Jebel |
| 2002/0027222 | A1 | * | 3/2002 | Struck ...................... B66D 3/16 254/299 |
| 2016/0311668 | A1 | | 10/2016 | Huang |
| 2017/0240395 | A1 | | 8/2017 | Guo et al. |
| 2019/0002254 | A1 | * | 1/2019 | Dennis .................... F16H 57/10 |

FOREIGN PATENT DOCUMENTS

| | | |
|---|---|---|
| CN | 206553130 U | 10/2017 |
| CN | 108715417 A | 10/2018 |
| DE | 3330539 C2 | 12/1986 |
| DE | 19927847 C1 | 10/2000 |
| DE | 19959999 C2 | 10/2001 |
| DE | 102006001154 B4 | 1/2009 |
| DE | 102017108694 A1 | 10/2018 |
| EP | 3395746 A1 | 10/2018 |
| JP | S52-088156 U | 7/1977 |
| JP | H07-101683 A | 4/1995 |

OTHER PUBLICATIONS

International Search Report of International Application No. PCT/DE2021/100947 mailed Apr. 5, 2022; 20pp.

Search Report for German Application No. 10 2021 101 058.6 mailed Jul. 20, 2021; 10pp.

Office Action for JP application No. 2023-543093 mailed Oct. 30, 2024; 16pp.

Office Action for Canadian Application No. 3,208,626, mailed Jan. 30, 2025, 4pp.

Office Action for Australian Application No. 2021422474 mailed Aug. 6, 2024; 3pp.

Office Action for Chile Application No. 2023-02072 mailed Jun. 17, 2024; 24pp.

Office Action for KR Application No. 10-2023-7028268, mailed Apr. 17, 2025, 7pp.

* cited by examiner

LIFTING GEAR

RELATED APPLICATION(S)

The present application is a National Phase of International Application Number PCT/DE2021/100947 filed Nov. 29, 2021, and claims priority of German Application Number 10 2021 101 058.6, filed Jan. 19, 2021.

FIELD

The disclosure relates to a lifting gear.

Lifting gears use round steel chains as support or traction means and serve for lifting, lowering and pulling loads. The present disclosure relates to a motorized lifting gear in which an electric motor, for example, a rechargeable battery operated electric motor, is used as a drive. A compressed air motor or a hydraulic motor also is able to serve as a drive.

Lifting gears have a support hook as an upper fastening element, and a load hook as a lower attachment element. The upper fastening element and the lower attachment element are connected to one another indirectly by way of a housing. The attachment element by way of a load chain as the traction means is connected to a traction means drive which is located in the housing of the lifting gear. In the case of an electric lifting gear, the traction means drive is set in rotation by the electric motor. To this end, the electric motor interacts with a drive shaft of the lifting gear, said drive shaft by way of a gearbox driving the load chain sprocket.

BACKGROUND

An electric lifting gear is described in DE 33 30 539 C2. An electric lifting gear is also known from DE 10 2006 001 154 B4.

A brake clutch system which secures loads for powered lifting gears, for example, for electric chain mechanisms, is described in DE 199 27 847 C1. The latter includes an entrainment clutch for connecting the end side of the motor shaft to a friction clutch which is embodied as a double plate clutch. A clutch entrainment plate is integrated between the two clutch plates.

Lifting gears with load pressure brakes are described by DE 199 59 999 C2 and U.S. Pat. No. 3,090,601 A. Load pressure brakes of the customary type of construction operate by way of a locking mechanism in the lifting sense of direction. Such load pressure brakes are not suitable for comparatively high rotating speeds. The thermal dissipation of the heat created by the frictional processes in the load pressure brake is inadequate.

A winch in which braking is achieved by cam activation is described in U.S. Pat. No. 5,482,255 A. For braking or stopping in a static state, the activation of the cam locks the drive shaft by frictional engagement. A reduction gear mechanism is provided between the drive shaft and a rope drum. The brake mechanism serves for locking the drive shaft on the rope drum, as a result of which a rotating movement of the shaft and of the winch is stopped or braked. The brake, or the brake mechanism, is located in the rope drum, and power take-off likewise takes place by way of the rope drum. Braking is performed against the fixed drive shaft.

The brake device of the winch is described in CN 201 619 981 U and CN 200 981 801 Y.

A winch having axially aligned brakes is described in US 2019/0002254 A1. This is a mechanically acting brake which possesses ratchets.

A torque-limiting and conical brake assembly for a motor winch is described in US 2016/0311668 A1.

The technical background furthermore includes DE 10 2017 108 694 A1, US 2017/0240395 A1 and CN 206 553 130 U.

SUMMARY

The disclosure is based on the object of achieving a lifting gear which is improved in terms of operation and safety, for example, a motorized lifting gear which has a functionally improved brake clutch system.

This object is achieved according to the disclosure by an electric lifting gear.

The lifting gear has a load chain sprocket and a drive shaft, which drives the load chain sprocket by way of a gearbox, and a motor having a motor shaft. The motor shaft and the drive shaft are coupled by way of a brake clutch system.

According to the disclosure, the brake clutch system comprises a clutch part, which is able to be coupled to the motor shaft, and a brake hub, which is rotatably disposed on a brake thread of the drive shaft. The clutch part has dogs, and the brake hub has pegs. A vane disk is disposed between the clutch part and the brake hub. This vane disk possesses vane bodies which are directed radially outward and is disposed on a coupling portion of the drive shaft. The vane disk is disposed in a rotationally fixed manner on the coupling portion of the drive shaft. This is established by a splined joint between the vane disk and the coupling portion. A pressure plate is positioned in a rotationally fixed manner proximal to the gearbox on the drive shaft, thus on the side of the brake hub that faces away from the clutch part. Two friction disks, and a brake disk incorporated between the friction disks, are disposed between the brake disk and the pressure plate. The brake disk is mounted in a rotationally fixed manner, i.e. so as to be secured against rotation.

The disclosure achieves a motorized and thus faster running lifting gear which functions using a purely mechanical brake clutch system. The lifting gear according to the disclosure is electrically driven by means of an electric motor. In this context, a battery or a rechargeable battery is able to be used as an energy store. Even though the lifting gear is electrically driven, driving is also able to take place by way of a compressed air motor or a hydraulic motor.

The lifting gear according to the disclosure is also distinguished by improved thermal dissipation. The thermal transfer takes place by physical contact between the brake disk and the housing. The improved thermal dissipation improves the operational use, for example, during continuous operation and/or under high loading of the lifting gear.

The mechanical brake clutch system, for example, the design of the brake of the lifting gear according to the disclosure increases the operational safety. The load is securely held when the drive fails. This is advantageous in the case of electric lifting gears powered by a rechargeable battery.

The dogs of the clutch part and the pegs of the brake hub, and the vane bodies of the vane disk, are configured to come into mutual contact and interact with one another during the operation of the lifting gear, thus during rotation.

The brake hub is axially displaceable on the threaded portion of the drive shaft that comprises the brake thread.

The brake disk is mounted in a rotationally secured manner in the housing of the lifting gear.

To this end, the brake disk has recesses, in which counter bearing members provided on the housing engage. One advantageous embodiment provides that the recesses are provided on the external circumference of the brake disk, and the counter bearing members are provided on a wall of the housing. The brake disk is held in the housing in the manner of a stub shaft spline and in terms of orientation is rotationally fixed. This is a multiple form-fit connection in which there is a high degree of contact, the thermal transfer faces between the brake disk and the housing thus being large.

The brake disk is mounted on the drive shaft so as to be rotatable by means of the brake thread. The pressure plate cannot twist relative to the drive shaft nor be displaced axially. The two friction disks having the intervening brake disk are disposed between the brake hub and the pressure plate.

The brake hub on that side that is directed toward the pressure plate has an annular receptacle. The first friction disk is received on the receptacle. To this end, the friction disk by way of the centric central opening thereof is placed onto the annular receptacle of the brake hub.

The pressure plate on that side that is directed toward the brake hub has a receptacle portion. The second friction disk is disposed on the receptacle portion. The receptacle portion is also configured in the shape of a stub or ring, respectively. The second friction disk by way of the centric central opening thereof is placed onto the receptacle portion.

The first friction disk and the second friction disk are separate components. In principle, the first friction disk is able to be fixedly connected to the rear side of the brake hub, or to form a component part of the brake hub. The second friction disk also is able to be fixedly connected to the pressure plate, or form a component part of the pressure plate. The brake disk is mounted in a rotationally secured manner in the housing, so as to be between the first friction disk and the second friction disk.

In at least one embodiment, the clutch part has dogs which protrude axially in the direction of the brake hub, and the brake hub has pegs which protrude axially in the direction toward the clutch part. Axially projecting means that the dogs of the clutch part and the pegs of the brake hub are axially mutually oriented such that said dogs and pegs come into mutual contact and interact with one another during a rotating movement.

The dogs of the clutch part and the pegs of the brake hub are rotatable relative to one another. The dogs and the pegs come into mutual contact during a rotating movement of the clutch part for lowering a load.

Furthermore, the dogs of the clutch part and the vane bodies of the vane disk are rotatable relative to one another. The dogs and the vane bodies come into mutual contact on corresponding detent and bearing faces during a rotating movement of the clutch part for lifting a load.

Furthermore, the dogs of the clutch part and the pegs of the brake hub come into mutual contact during a rotating movement of the clutch part for lifting a load, as a result of which the dogs drive the loosely co-rotating brake hub.

The clutch part has a disk body with dogs. In at least one embodiment, the clutch part is a component part of the output stage of the electric motor, the latter being a geared motor which lies ahead of the brake. The dogs are configured as a materially integral one-piece component part on the disk body. The dogs are oriented axially such that they mesh with the pegs of the brake hub and come into operative contact when rotating relative to one another. The clutch part, or the disk body of the clutch part, respectively, is a component part of the output gear of a planetary gear mechanism.

The brake disk is mounted so as to be rotationally fixed in the housing. The housing is able to be formed from housing parts or housing halves. The housing halves are releasably screwed to one another. The motor housing is able to be integrated in the gearbox housing.

In at least one embodiment, the brake mechanism of the brake clutch system has additional spring elements. The spring elements are defined and specified to facilitate the closing of the brake in the event of slow movements. Provided to this end are spring elements which push the brake disk against the brake hub. The spring elements are supported in the housing. The spring-elastic contact pressure of the brake disk in relation to the brake hub has the effect that a minimal frictional torque is generated even when the brake is opened, said frictional torque being required for closing the brake, or the brake clutch system, respectively.

The spring elements are supported in the housing on that side that faces away from the brake disk. The end of a spring element that faces away from the brake disk is received in a receptacle in the housing.

BRIEF DESCRIPTION OF THE DRAWINGS

The following description relates to further advantages, features, properties and aspects of the disclosure. The figures depict exemplary embodiments to illustrate the concept of the disclosure.

In the figures.

DETAILED DESCRIPTION

FIGS. 1 to 5 show a lifting gear 1 according to the disclosure. Components and component parts of the lifting gear 1 are able to be seen in an exploded illustration in FIG. 6. This is an electric lifting gear 1.

The lifting gear 1 has a support hook 2 as an upper fastening element. A load hook not illustrated in the figures acts as a lower attachment element. The support hook 2 and the load hook are connected indirectly to one another by way of a housing 3. The load hook is attached to the end of a load chain. For the sake of clarity, the load chain is also not illustrated in FIGS. 1 to 6.

The load chain is able to be moved by way of a traction means drive. The traction means drive has a drive shaft 4, which drives a load chain sprocket 6 by way of a gearbox 5. FIGS. 1 to 6 show the lifting gear 1 without a housing cover of the gearbox 5.

The load chain runs by way of the load chain sprocket 6 and is moved by the latter.

Figure 1:
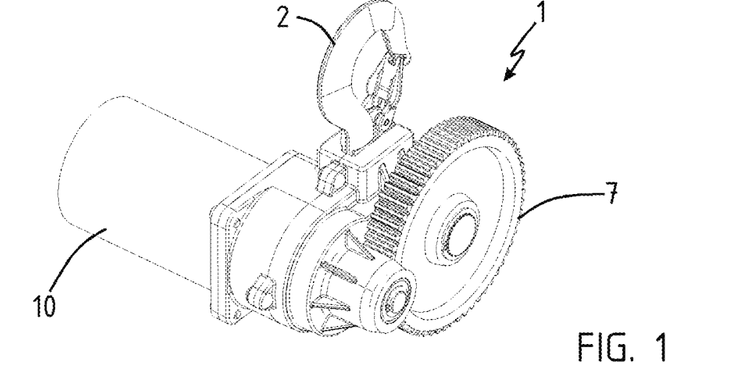
FIG. 1 shows an electric lifting gear according to the disclosure in a perspective view, without an external housing according to at least one embodiment.
Figure 2:
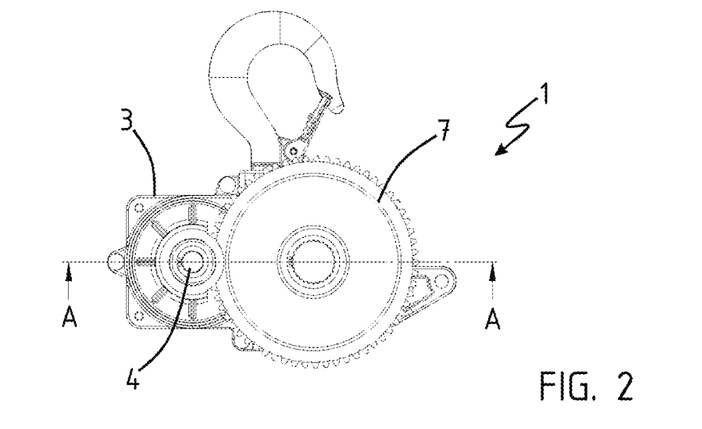
FIG. 2 shows the lifting gear of FIG. 1 in a lateral view according to at least one embodiment.
Figure 3:
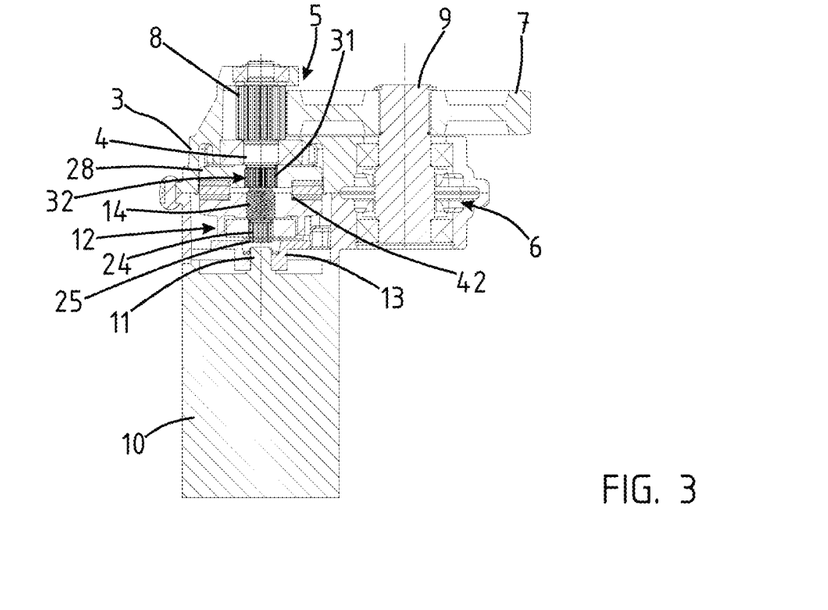
FIG. 3 shows a horizontal cross section through the illustration of FIG. 2, along the line A-A according to at least one embodiment.
Figure 4:
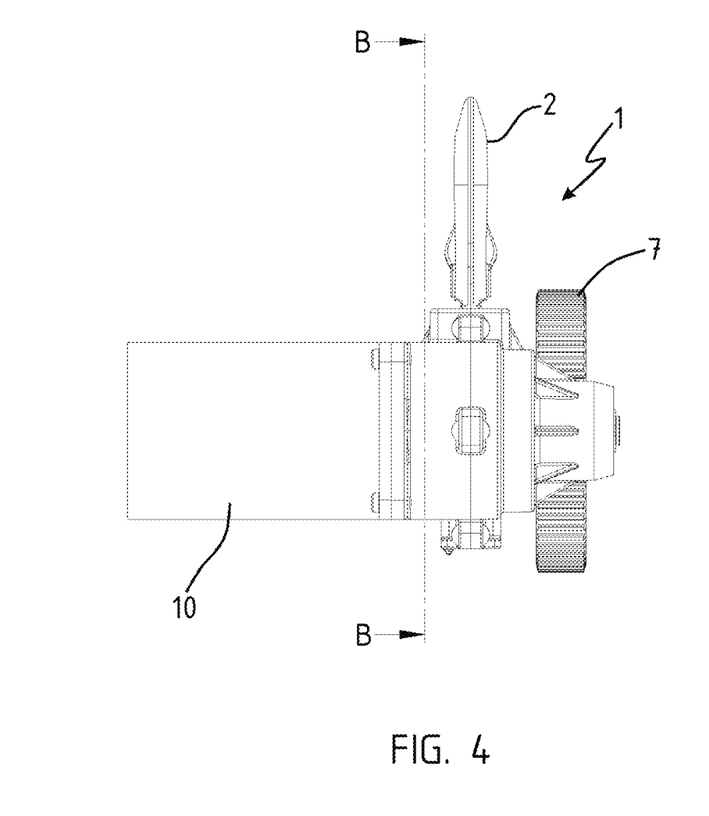
FIG. 4 shows the lifting gear in a lateral view according to at least one embodiment.
Figure 5:
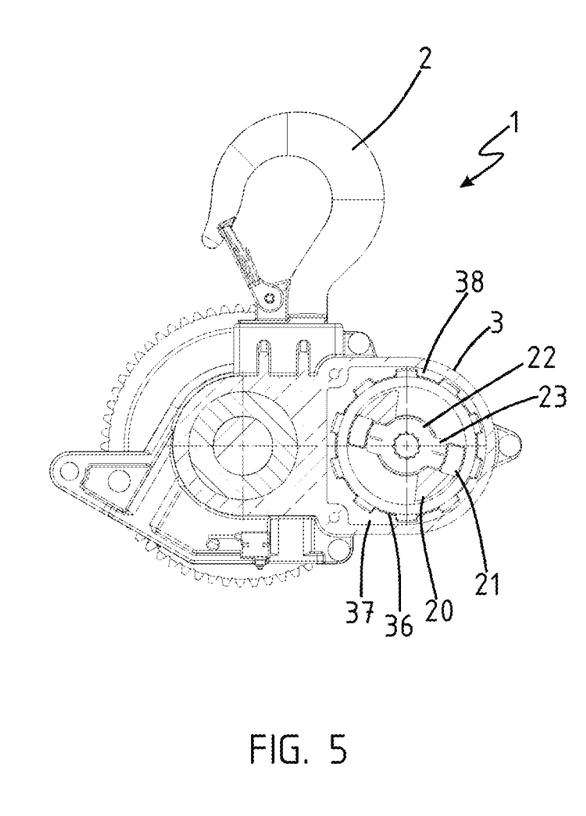
FIG. 5 shows a vertical cross section through the illustration of FIG. 4, along the line B-B according to at least one embodiment.
Figure 6:
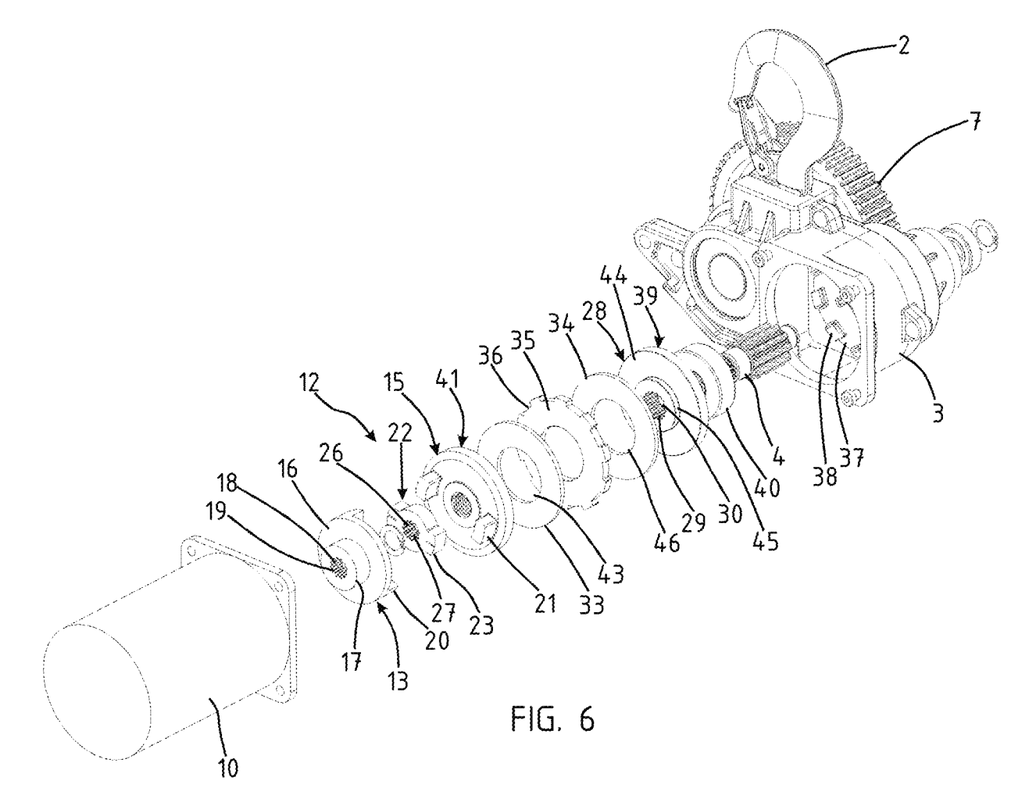
FIG. 6 shows the lifting gear according to the disclosure in an exploded illustration of the components thereof according to at least one embodiment.

Driving takes place by way of an electric motor 10, the motor shaft 11 of the latter being coupled to the drive shaft 4 by way of a brake clutch system 12 (cf. for this purpose see also the exploded illustration according to FIG. 6).

The brake clutch system 12 includes a clutch part 13, which is able to be coupled to the motor shaft 11, and a brake hub 15 which is rotatably disposed on a brake thread 14 of the drive shaft 4.

The clutch part 13 has a disk body 16 and a connecting portion 17 which projects from the disk body 16 in the direction toward the electric motor 10. A coupling receptacle 18 having an internal toothing 19 is provided so as to be centric in the connecting portion 17. The clutch part 13 by way of the coupling receptacle 18 is able to be placed onto a complementary external toothing of the motor shaft 11.

The clutch part 13 has dogs 20, which project axially in the direction of the brake hub 15, and the brake hub 15 has pegs 21, which project axially in the direction toward the clutch part 13. A vane disk 22 is disposed between the clutch part 13 and the brake hub 15. The vane disk 22 possesses vane bodies 23, which are directed radially outward. The vane disk 22 is disposed in a rotationally fixed manner on a coupling portion 24 of the drive shaft 4. This is established by way of a splined joint between the vane disk 22 and the coupling portion 24. The coupling portion 24 possesses an external toothing 25 onto which is placed the vane disk 22 by way of an internal toothing 26, the latter being provided in the centric assembly opening 27 of the vane disk 22.

Proximal to the gearbox, on that side of the brake hub 15 that faces away from the clutch part 13, a pressure plate 28 is positioned in a rotationally fixed manner on the drive shaft 4. To this end, the pressure plate 28 in the centric assembly opening 30 thereof has an internal toothing 29 which is positioned on a toothed assembly portion 32 of the drive shaft 4 that has an external toothing 31.

A first friction disk 33 and a second friction disk 34 are provided between the brake hub 15 and the pressure plate 28. A brake disk 35 is disposed between the two friction disks 33, 34. The brake disk 35 is mounted in the housing 3 in a rotationally fixed or rotationally secured manner. To this end, the brake disk 35 on the external circumference thereof has pocket-type recesses 36. Tooth-shaped or claw-shaped counter bearing members 38, which in terms of configuration are adapted to the recesses 36, are provided in a wall 37 of the housing 3. The counter bearing members 38 engage in the recesses 36 so that the brake disk 35 is fixedly established in the housing 3 in the manner of a stub shaft spline.

The pressure plate 28 is supported on a bearing 40 on the rear side 39 of the pressure plate 28 that is directed toward the gearbox 5.

The brake hub 15 on the rear side, i.e. on the rear side 41 thereof that is directed toward the brake disk 35, has a centric annular receptacle 42. The first friction disk 33 by way of the centric opening 43 thereof is placed onto the receptacle 42.

The pressure plate 28 on the front side 44 thereof that is directed toward the brake disk 35 has a centric receptacle portion 45. The second friction disk 34 has a centric opening 46 by way of which the second friction disk 34 is placed onto the receptacle portion 45 of the pressure plate 28 and positioned thereon.

The brake hub 15 by means of the brake thread 14 is rotatably mounted on the drive shaft 4. The pressure plate 28 neither twists in relation to the drive shaft 4 nor is displaced axially. The two friction disks 33, 34 and the intervening brake disk 35 are disposed between the brake hub 15 and the pressure plate 28. The brake disk 35 is mounted in a rotationally secured manner in the housing 3.

The motion sequences in the brake clutch system 12 of the lifting gear 1 while holding, lowering and lifting a load are explained by means of FIGS. 7 to 10.

Of the clutch part 13, in each case the dogs 20 that project in the direction toward the brake hub 15 are illustrated in FIGS. 7 to 10.

The dogs 20 of the clutch part 13 and the pegs 21 of the brake hub 15 are disposed on a common outer revolving path or orbit, respectively, so that said dogs 20 and said pegs 21 come into contact and thus are operatively engaged when the clutch part 13 and the brake hub 15, and thus the dogs 20 and the pegs 21, are rotated relative to one another.

The vane bodies 23 of the vane disk 22 and the dogs 20 of the clutch part 13 are also disposed on an inner revolving path or orbit, respectively, so that said vane bodies 23 and said dogs 20 come into contact and thus operatively engage when said vane bodies 23 and said dogs 20 are rotated relative to one another.

Figure 7:
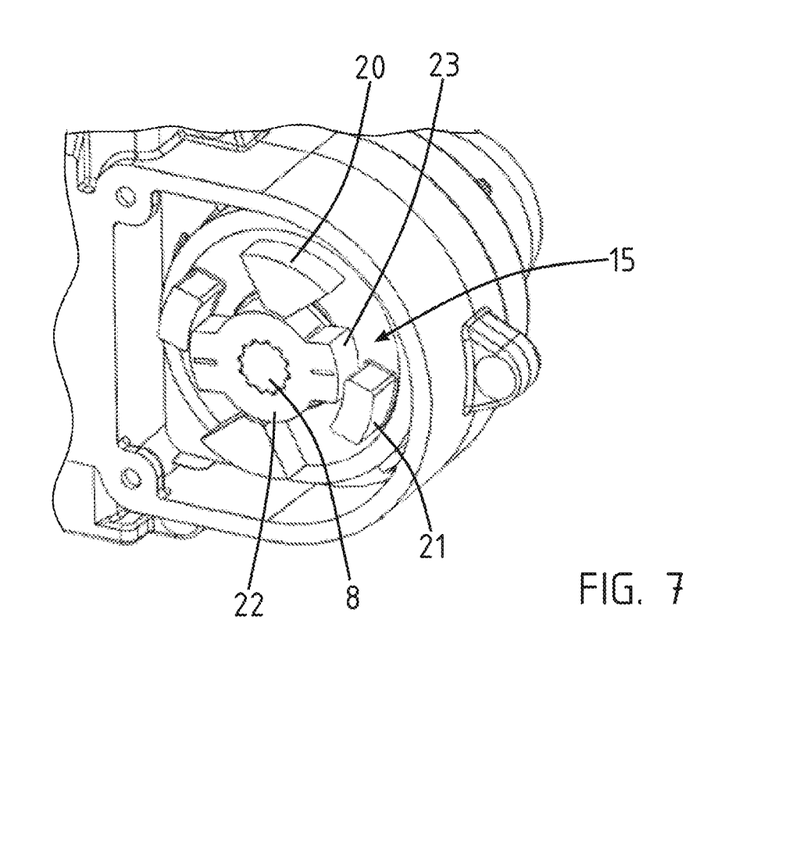
FIG. 7 shows a perspective view of components, or component parts, of the brake clutch system of the lifting gear with the electric motor removed, in a first operational position according to at least one embodiment.

For holding a load, the load moment acting on the drive shaft 4 generates an axial force acting on the brake hub 15, as a result of which the latter braces the friction disks 33, 34, lying between the brake hub 15 and the pressure plate 28, and the intervening brake disk 35. As the brake disk 35 is supported in relation to the housing 3, the load is securely held. The dogs 20 of the clutch part 13 herein are neither in contact with the vane bodies 23 of the vane disk 22 nor with the pegs 21 of the brake hub 15. This operational position is shown in FIG. 7.

Figure 8:
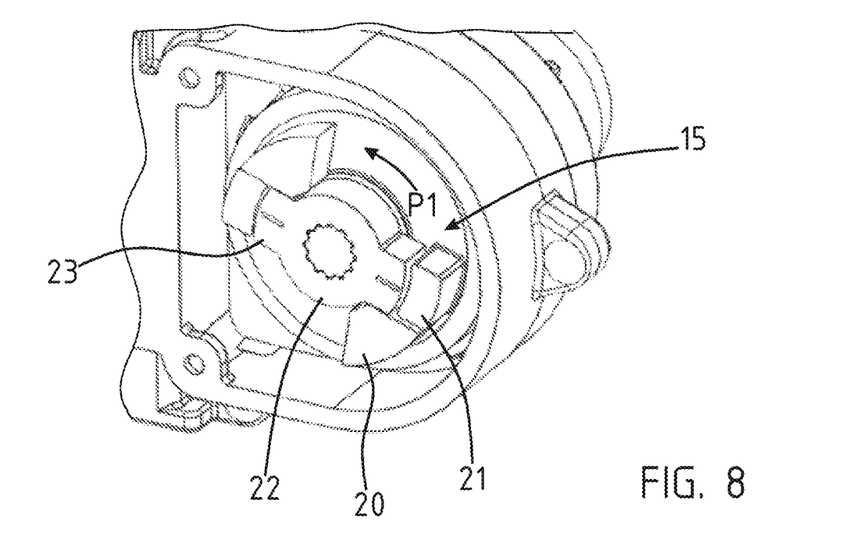
FIG. 8 shows an illustration corresponding to that of FIG. 7, in a second operational position of the brake clutch system according to at least one embodiment.
Figure 9:
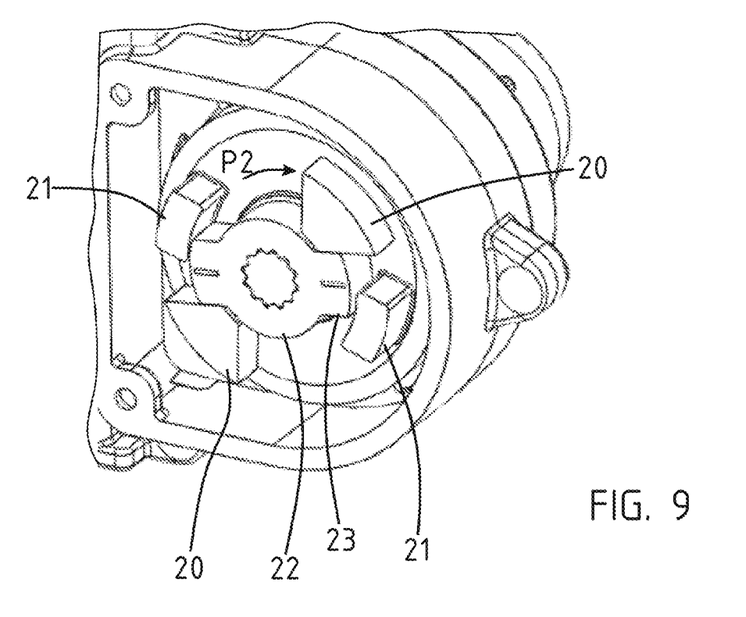
FIG. 9 shows an illustration corresponding to that of FIG. 7, in a third operational position of the brake clutch system according to at least one embodiment.
Figure 10:
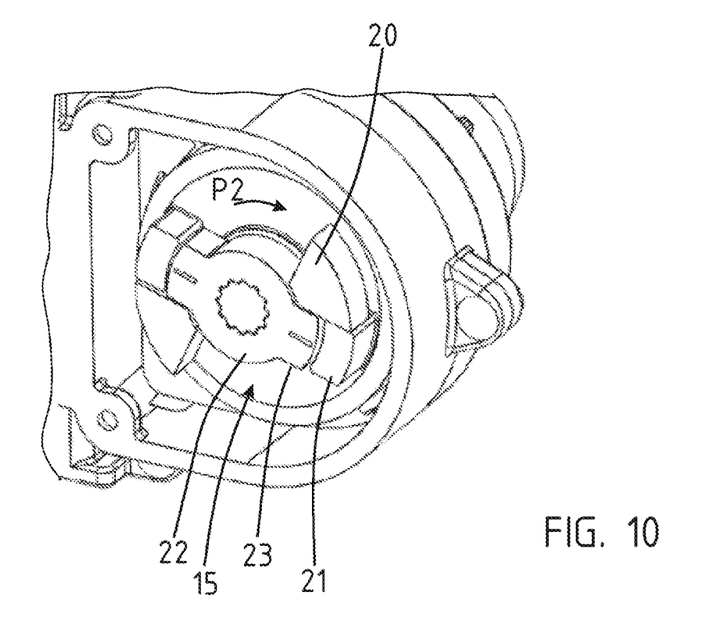
FIG. 10 shows an illustration corresponding to that of FIG. 7, in a fourth operational position of the brake clutch system according to at least one embodiment.
Figure 11:
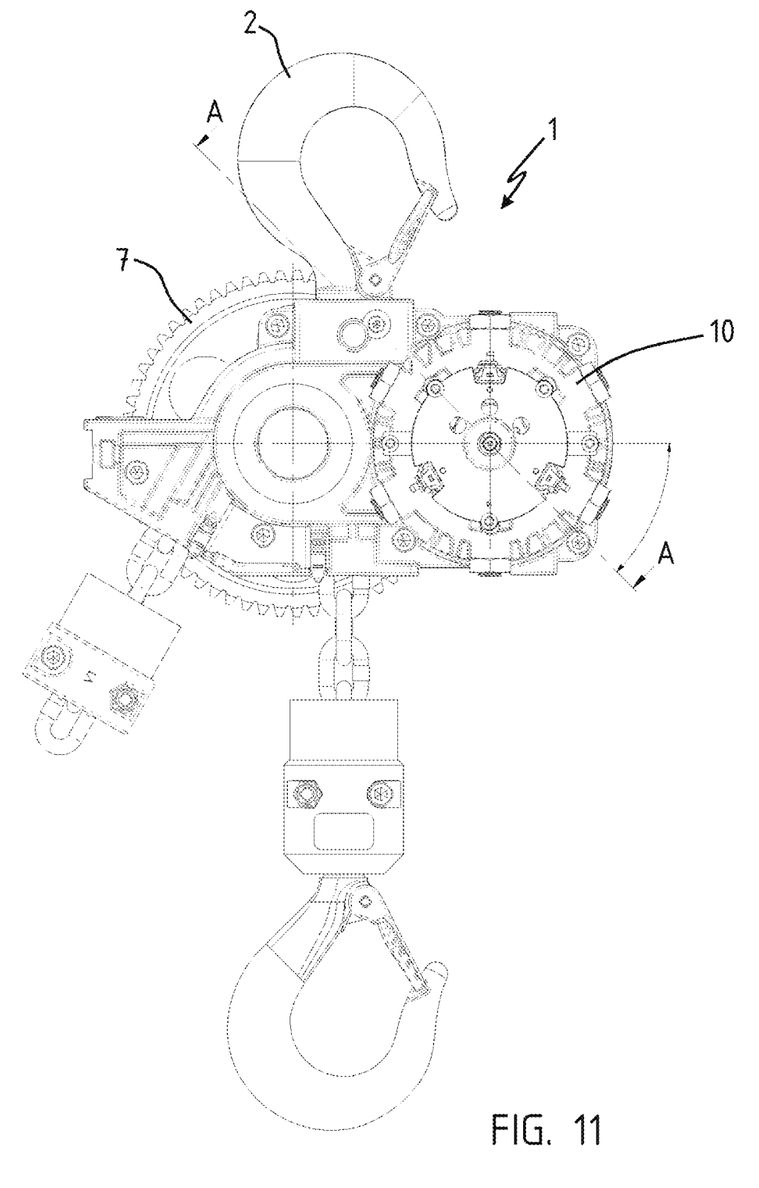
FIG. 11 shows a further embodiment of a lifting gear according to the disclosure, in a lateral view according to at least one embodiment.
Figure 12:
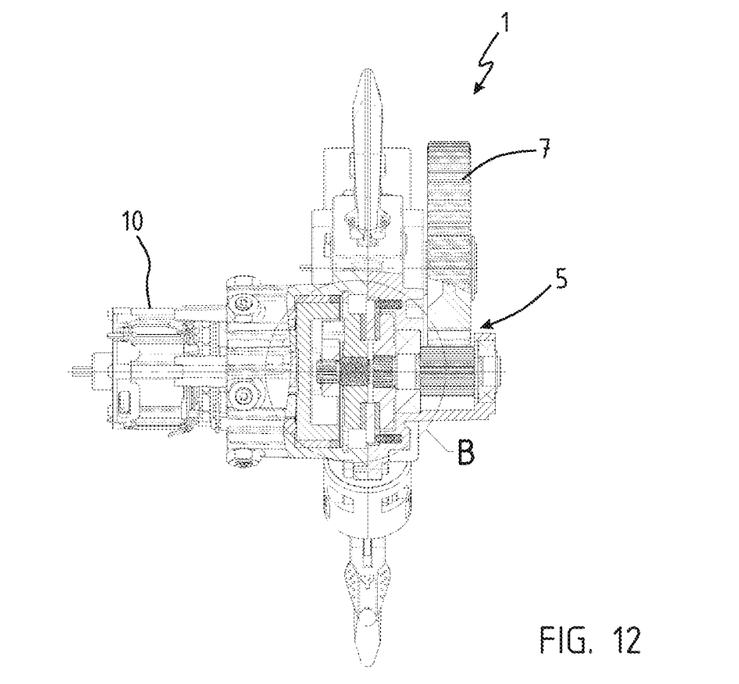
FIG. 12 shows a section through the illustration of FIG. 11, along the line A-A according to at least one embodiment.
Figure 13:
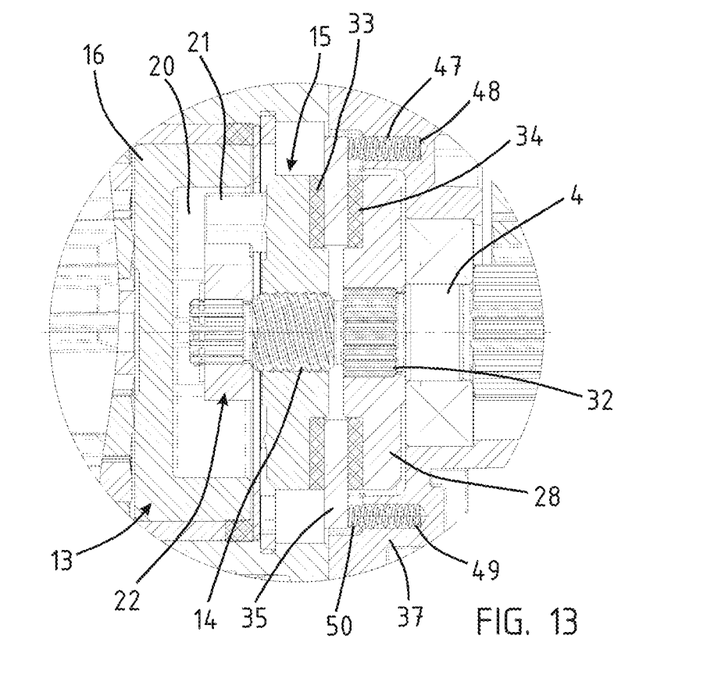
FIG. 13 shows the fragment B from FIG. 12, in an enlarged illustration according to at least one embodiment.
Figure 14:
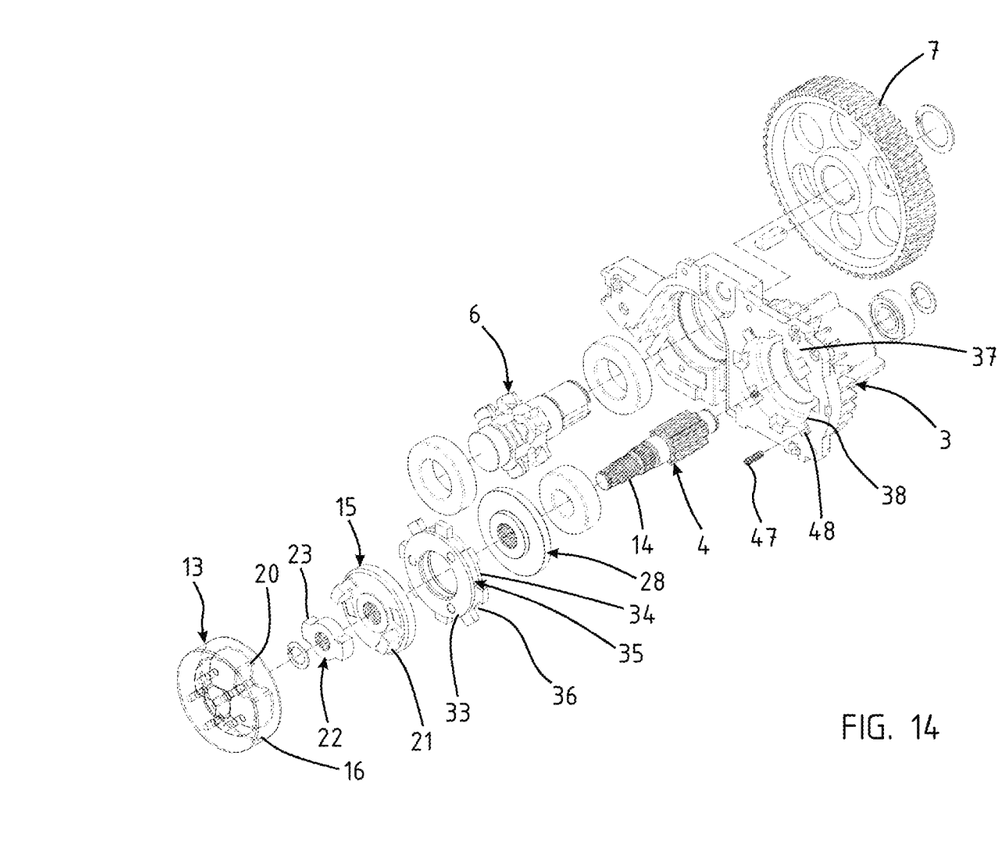
FIG. 14 shows the lifting gear according to the disclosure in an exploded illustration of the substantial components, or component parts, thereof.
Figure 15:
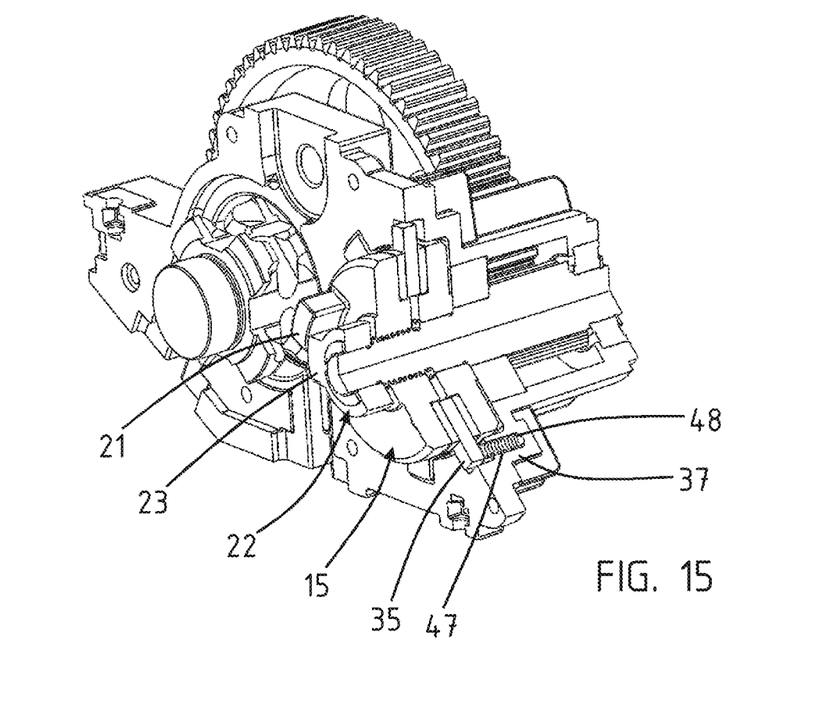
FIG. 15 shows a perspective view of components, or component parts, of the brake clutch system of the lifting gear, partially in a sectional illustration according to at least one embodiment.
Figure 16:
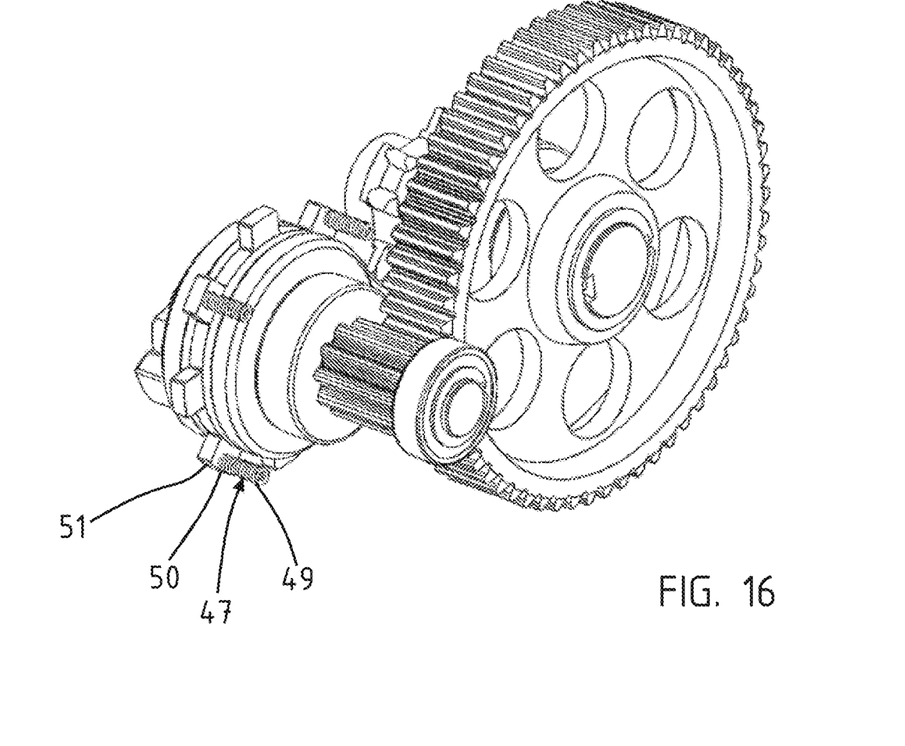
FIG. 16 shows a perspective view of components, or component parts, of the lifting gear, in a gearbox-proximal view according to at least one embodiment.

For lowering a load (see FIG. 8), the clutch part 13 is rotated in a counterclockwise manner (arrow P1) so that the dogs 20 of the clutch part 13 come into contact with the pegs 21 of the brake hub 15 and drive the brake hub 15. The rotating movement takes place in the direction of the arrow P1. The brake hub 15 slides axially on the brake thread 11 of the drive shaft 4, and the friction engaging contact with the first friction disk 33 is canceled. As a result, the axial force or the frictional moment, respectively, is reduced and a load is lowered until the frictional moment has been reinstated. This operational position is shown in FIG. 8. The load is able to be lowered until the rotationally following drive shaft 4 compensates the axial clearance again. The dogs 20 of the clutch part 13, which are configured so as to be approximately triangular or trapezoidal, engage on the pegs 21. The dogs 20, by way of the acting faces thereof that lie further inward, contact the vane bodies 23 of the vane disk 22.

For lifting the load, the clutch part 13 is rotated in the clockwise direction. This is highlighted by the arrow P2 in FIG. 9. As a result of the rotation, or in the rotating movement, of the clutch part 13, respectively, the dogs 20 and the vane bodies 23 are rotated relative to one another. The dogs 20 of the clutch part 13 impact the detent faces of the vane bodies 23 of the vane disk 22. The vane disk 22 sits in a rotationally fixed manner on the drive shaft 4 so that the drive shaft 4 is driven by way of the vane disk 22. The frictional moment is canceled as a result of the rotation of the drive shaft 4 relative to the brake hub 15, and the driving moment is now transmitted to the drive shaft 4 by way of the internal toothing 26 of the vane disk 22. The dogs 20 of the clutch part 13 drive the loosely co-rotating brake hub 15.

A further embodiment of a lifting gear 1 according to the disclosure is illustrated in FIGS. 11 to 16. The lifting gear 1 according to the illustrations of FIGS. 11 to 16 in terms of the principal construction corresponds to the previously described lifting gear. Equivalent components and component parts are provided with the same reference signs. Reference is made to the above explanation of the lifting gear 1.

The brake clutch system 12 includes a clutch part 13, which is able to be coupled to the motor shaft 11, and a brake hub 15 which is rotatably disposed on a brake thread 14 of the drive shaft 4. The clutch part 13 has a disk body 16 having dogs 20 configured thereon. The clutch part 13 and the disk body 16 thereof are a component part of a planet gear of the output stage of a planetary gearbox by way of which an electric motor, not illustrated here, drives the lifting gear 1.

The clutch part 13 has dogs 20 which are oriented toward the side of the brake hub. The brake hub 15 has pegs 21 which project axially in the direction toward the clutch part 13.

The vane disk 22 is disposed between the clutch part 13 and the brake hub 15.

The dogs 20 are a materially integral one-piece component part on the disk body 16 of the clutch part 13, and are oriented axially in the direction toward the brake hub 15. During the operation of the lifting gear 1, the dogs 20 mesh with the pegs 21 of the brake hub 15 that project in the direction toward the clutch part 13. During a rotation, the dogs 20 of the clutch part 13 and the pegs 21 of the brake hub 15, and the vane bodies 23 of the vane disk 22, come into mutual contact and interact in a torque-transmitting manner.

The brake disk 35 is disposed between the brake hub 15 and the pressure plate 28. The first friction disk 33 and the second friction disk 34 are joined to the front and rear planar face of the brake disk 35, respectively. The brake disk 35 is mounted in a rotationally fixed and rotationally secured manner in the housing 3.

The braking procedures in the brake clutch system 12 of the lifting gear 1 when holding, lowering and lifting a load correspond to the sequence explained above.

In the lifting gear 1 illustrated in FIGS. 11 to 16, additional spring elements 47 are integrated in the brake clutch system 12. The spring elements 47 are defined and specified for pressing the brake disk 35 against the brake hub 15. The spring elements 47 are supported in the housing 3. Provided to this end are receptacles 48 on that side in the housing 3 that faces away from the brake disk 35. The spring elements 47 are compression springs, for example, coil springs. The latter by way of one end 49 are positioned in the receptacles 48 in the housing 3 and by way of the other end 50 act against the brake disk 35. In the embodiment illustrated, a total of four spring elements 47 are disposed so as to be uniformly offset on a pitch circle. As able to be seen in FIG. 16, the ends 50 of the spring elements 47 bear on outer tooth members 51 of the brake disk 35.

The spring-elastic contact pressure of the brake disk 35 against the brake hub 15 has the effect that a minimal frictional moment is generated at all times, even in the event of an opened brake, said frictional moment contributing toward assisting closing of the brake, or the brake clutch system 12, respectively.

The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. Various changes, substitutions and alterations can be made hereto without departing from the spirit and scope of the disclosure.

The invention claimed is:

1. A lifting gear, comprising:
   a load chain sprocket;
   a gearbox;
   a drive shaft configured to drive the load chain sprocket by the gearbox;
   a brake clutch system; and
   a motor having a motor shaft, the motor shaft and the drive shaft being coupled by the brake clutch system, wherein the brake clutch system has
   (i) a clutch part, which is configured to be coupled to the motor shaft, and
   (ii) a brake hub, which is rotatably disposed on a brake thread of the drive shaft,
   the clutch part has dogs and the brake hub has pegs,
   a vane disk is disposed between the clutch part and the brake hub, has vane bodies, and is disposed on a coupling portion of the drive shaft,
   a pressure plate is positioned in a rotationally fixed manner on the drive shaft proximal to the gearbox,
   two friction disks and a brake disk are disposed between the brake hub and the pressure plate, and
   the brake disk is incorporated between the two friction disks, and the brake disk is mounted in a rotationally fixed manner.

2. The lifting gear as claimed in claim 1, wherein the dogs and the pegs are rotatable relative to one another and, during a rotating movement of the clutch part for lowering a load, come into mutual contact.

3. The lifting gear as claimed in claim 1, wherein the dogs and the vane bodies are rotatable relative to one another and, during a rotating movement of the clutch part for lifting a load, come into mutual contact.

4. The lifting gear as claimed in claim 3, wherein, during the rotating movement of the clutch part in a direction of rotation for lifting the load, the dogs and the pegs come into contact and the brake hub is moved in the direction of rotation.

5. The lifting gear as claimed in claim 1, wherein the brake disk is mounted in a housing.

6. The lifting gear as claimed in claim 5, wherein the brake disk has recesses, in which counter bearing members provided on the housing engage.

7. The lifting gear as claimed in claim 6, wherein the recesses are provided on an external circumference of the brake disk, and the counter bearing members are provided on a wall of the housing.

8. The lifting gear as claimed in claim 1, wherein the pressure plate proximal to the gearbox is supported on a bearing.

9. The lifting gear as claimed in claim 1, wherein the brake hub, on a side that is directed toward the pressure plate, has an annular receptacle on which a first friction disk of the two friction disks is disposed.

10. The lifting gear as claimed in claim 1, wherein the pressure plate, on a side that is directed toward the brake hub, has a receptacle portion on which a second friction disk of the two friction disks is disposed.

11. The lifting gear as claimed in claim 1, wherein the dogs project in an axial direction toward the brake hub, and the pegs project in the axial direction toward the clutch part.

12. The lifting gear as claimed in claim 1, further comprising spring elements which are defined and specified to press the brake disk against the brake hub.

13. The lifting gear as claimed in claim 12, wherein the spring elements are supported in a housing of the brake disk.

14. The lifting gear as claimed in claim 2, wherein the dogs and the vane bodies are rotatable relative to one another and, during a rotating movement of the clutch part for lifting a load, come into mutual contact.

* * * * *